Patented Apr. 5, 1927.

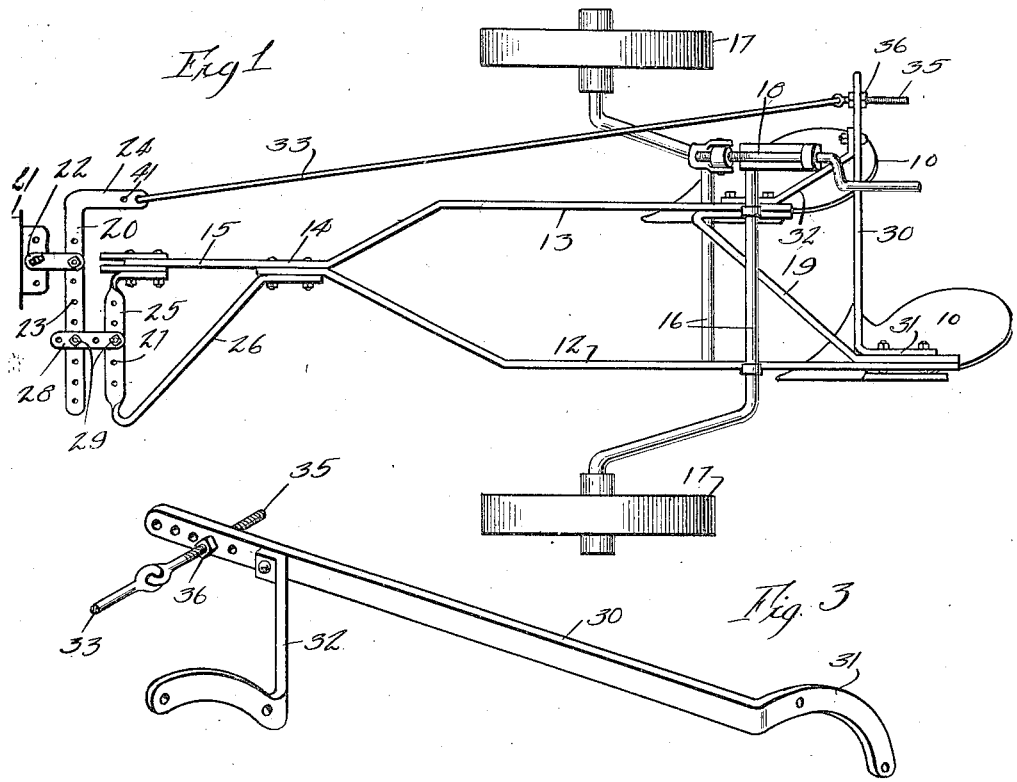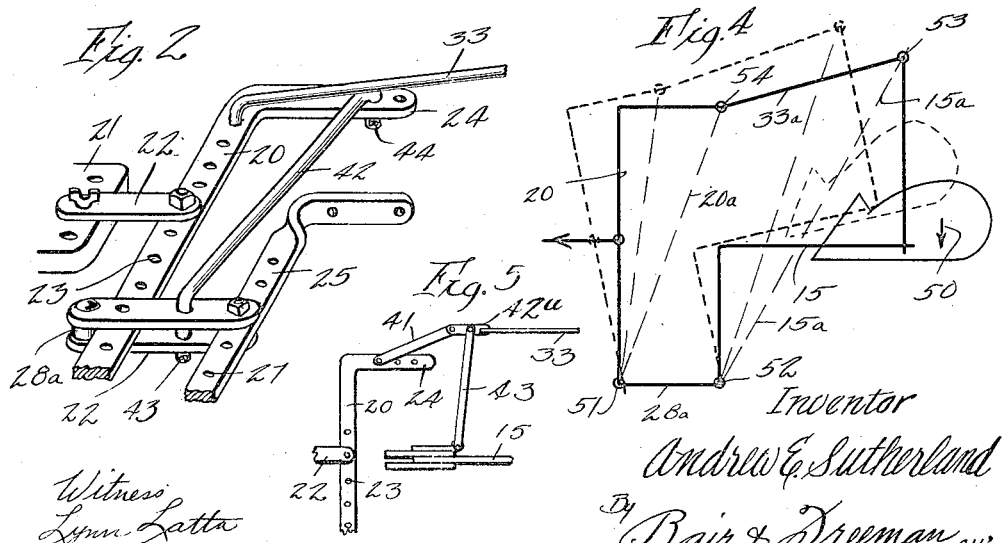

1,623,642

UNITED STATES PATENT OFFICE.

ANDREW E. SUTHERLAND, OF MADRID, IOWA.

PLOW HITCH.

Application filed December 17, 1923. Serial No. 681,097.

The object of my invention is to provide a plow hitch of simple, durable, inexpensive and novel construction.

More particularly, it is my object to provide a hitch for a single or plural bottom plow having its parts so constructed and arranged as to make land sides and rear furrow wheel unnecessary, so far as side draft is concerned.

A further object is to provide such a hitch so constructed as to automatically regulate the width of the land according to the draft.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a top or plan view of a two-bottom plow equipped with a plow hitch embodying my invention.

Figure 2 is a perspective view illustrating the forward part of the hitch with a slightly modified arrangement of the parts.

Figure 3 is an enlarged, perspective view of part of the hitch.

Figure 4 is a diagrammatic view, illustrating an exaggerated form of the operation of my improved hitch; and Figure 5 shows a plan view of a slightly different part of my hitch.

In the accompanying drawings, I have used the reference numeral 10 to indicate two plows having the beams 12 and 13, which are inclined toward each other and connected at their forward ends as at 14.

Extending forwardly from the point 14 is the common beam 15. The axles 16 are supported on the beams and have the wheels 17 and the ordinary adjusting mechanism 18. The cross brace 19 connects the beams 12 and 13.

I will now describe my improved hitch.

The hitch comprises a cross bar 20 designed to be connected with a tractor 21 or the like by means of a clevis or link or other suitable device 22. The bar 20 has a series of holes 23 for permitting adjustable connection of the clevis 22 at different points on the bar 20.

At one end, the bar 20 has the rear extension 24.

Secured to the forward end of the common beam 15 is a laterally projecting bar 25 from the end of which opposite the beam 15 a brace bar 26 is inclined rearwardly to the point 14 and is there secured to the beams 12 and 13.

The bar 25 also has a plurality of holes 27 for adjusting suitable links or the like 28.

Bolts 29 are used to connect the bar 20 and the bar 25.

I provide a special transverse frame member 30 rigidly connected at one end by means of the extension 31 with the beam 12. Near its other end a connecting brace 32 connects the frame member 30 with the beam 13, as shown in Figure 1.

A rod 33 has one end pivoted to the extension 24 and has its other end pivoted to a screw-threaded eye bolt 35 extended through the frame member 30 and held in position by means of the nuts 36.

In the practical use of my improved hitch, the bolt 29 and the clevis or link 22 are adjusted as may be desired with relation to the bar 20 and the bar 25.

It will be seen that with the hitch of the kind herein shown, the draft is largely upon the ordinary plow beams, but that part of it is upon the rod 33. By connecting the bar 30 as shown with the rear end of the plow beams and to the right-hand side of the machine and then connecting the rod 33 with the extension 24, it will be seen that the ordinary side draft will be largely overcome.

Another very important function of my improved hitch is illustrated in the diagram in Figure 4, and it will be seen that the greater part of the draft is on the ordinary plow beams.

It will be understood that the diagram is distorted so as to emphasize the lateral movement of the parts. Referring to the diagram, it is seen that the forward pull of the tractor is balanced by the resistance of the plows, communicated to the tractor draw bar through the rod 33 and the beam 15.

The pull transmitted through the rod 33, being communicated to the plow frame at a point considerably to the right of the line of draft, will tend to pull the plow toward that side. This lateral pull to the right will be mainly balanced by the pull to the left caused by the transmission of the draw bar pull to the beam 15 from the point 51, which is to the left of the line of draft. The remainder of the right lateral pull will be balanced by the ordinary side draft of the plow, indicated by the arrow 50.

It will be seen that when the resistance of the plows is increased, that there will momentarily be a corresponding increase in the effective draw bar pull, which will increase proportionately the two forces acting through the rod 33 and the beam 15.

Consequently, the resulting lateral forces will be increased.

However, the side draft will remain practically constant, and the total lateral pull toward the left will be thus smaller than the total lateral pull to the right. In order that these forces may balance, the plow will move toward the right until the total backward resistance of the plows is sufficiently diminished to bring the effective draw bar pull back to normal.

The operation of the device may be illustrated in another manner. The members 20, 28, 15 and 33 may be imagined as forming the sides 20$^a$, 28$^a$, 15$^a$ and 33$^a$ of a quadrilateral, having the corners 51, 52, 53 and 54, each of which forms a movable joint between the adjacent sides.

The draw bar pull is transmitted to the joints 51 and 54 and the resistance of the plows to the joint 52. Normally the side drag of the plows will distort the quadrilateral so as to decrease the distances between the sides 20$^a$ and 15$^a$.

When the resistance and pull are increased, effect will be to increase the distance between the sides 20$^a$ and 15$^a$, and to cause the quadrilateral to assume a more rectangular form. As a result, the parts will tend to assume the position shown in dotted lines in the diagram, the side 28 remaining practically stationary. When the resistance and pull are decreased, the side drag of the plow will return the parts to the heavy line position.

It further follows that a maximum draft is thus largely determined by the peculiar hitch. This is, of course, of great importance when the plowing is done with a tractor of certain power or under difficult conditions or wherever the plowing is done with horses.

The advantages of a hitch of this kind will be largely seen from the foregoing description and explanation.

The hitch is capable of considerable adjustment by the clevis 22 at different points on the bar 20 and by changing the links 28 on the bar 20 and bar 25.

Some adjustment is given also by the screw-threaded mounting of the nuts 36 on the eye bolt 33.

In Figure 2, I have shown a slightly modified form of hitch wherein the link 28 is slidably connected with the bar 20 by means of the roller 28$^a$. The rod 33 is linked to the bar 20 at the bend thereof, and the rod 42 connects the end of the extension 24 with the link 28. As the bar 20 moves forwardly with relation to the piece 25 under the increased pull of the tractor, the extension 24 will swing outwardly and move the link 28 toward the draw bar of the tractor, increasing the leverage in the pull upon the beam 15, and automatically aiding in balancing the effect of the pull on the rod 33.

In Figure 5, I have shown a slight modification of my hitch in which the rod 33 is connected with the extension 24 by a link 42$^a$ and clevis 41. Hinged or pivoted to the beam is a truss bar 43 one end of which is pivoted to the link 42$^a$. This form of the hitch may be used when desired as for very heavy cutting.

Some changes may be made in the details of the structure of my improved hitch without departing from the essential features and purposes of my invention, and it is my purpose to cover by my claim, any modified forms of structure or use of mechanical equivalents, which may be reasonably included within its scope.

I claim as my invention:

A hitch adapted to be used with a plow having a plow bottom and draft beam, said hitch comprising a bar attached to the beam and extending laterally therefrom in a landslide direction, a draft bar, a link pivoted to the draft bar and the first mentioned bar, means for hitching to said draft bar substantially in line with said beam, said draft bar extending from said hitch means in the direction the soil is turned and having a pivotal connection positioned rearwardly relative to the hitch means, a frame connected to the plow bottom and extending laterally therefrom in the direction the soil is turned and an adjustable connecting rod between the outer end of said frame and said pivotal connection.

Des Moines, Iowa, November 19, 1923.

ANDREW E. SUTHERLAND.